United States Patent [19]
Foss

[11] Patent Number: 5,826,979
[45] Date of Patent: Oct. 27, 1998

[54] WASTE MATERIAL PROCESSING APPARATUS AND METHOD

[76] Inventor: Milton K. Foss, 81 W. Vancouver Dr., Port Townsend, Wash. 98368

[21] Appl. No.: 923,171

[22] Filed: Sep. 4, 1997

Related U.S. Application Data

[63] Continuation-in-part of Ser. No. 697,538, Aug. 26, 1996, abandoned.

[51] Int. Cl.$^6$ .................................................. B01F 5/10
[52] U.S. Cl. ............................ 366/242; 366/262; 366/275
[58] Field of Search ............................... 366/51, 64, 241, 366/242, 262–265, 275, 342, 343, 349; 415/70; 417/410.3, 437, 474; 418/156

[56] References Cited

U.S. PATENT DOCUMENTS

| | | | |
|---|---|---|---|
| 1,922,196 | 8/1933 | Butler | 417/474 X |
| 3,216,362 | 11/1965 | Hewko | 418/156 X |
| 3,233,553 | 2/1966 | Chanton | 417/474 X |
| 4,173,419 | 11/1979 | Blok . | |
| 4,347,135 | 8/1982 | Lafosse et al. . | |
| 4,555,063 | 11/1985 | Goettsch | 366/264 X |
| 5,380,427 | 1/1995 | Foss . | |
| 5,425,581 | 6/1995 | Palm . | |
| 5,536,418 | 7/1996 | Foss . | |

FOREIGN PATENT DOCUMENTS

| | | | |
|---|---|---|---|
| 739718 | 8/1966 | Canada | 417/474 |
| 1378193 | 10/1964 | France | 417/474 |
| 637586 | 10/1936 | Germany | 417/474 |
| 57-140572 | 8/1982 | Japan | 418/156 |
| 605666 | 4/1978 | U.S.S.R. | 366/275 |
| 1656158 | 6/1991 | U.S.S.R. | 417/474 |
| 1783157 | 12/1992 | U.S.S.R. | 417/474 |

*Primary Examiner*—Charles E. Cooley
*Attorney, Agent, or Firm*—Dean A. Craine

[57] ABSTRACT

An apparatus for agitating small batches of septic waste material contained in a processing tank into sludge material and waste water using an oxidizing agent and a flocculating agent. The apparatus includes at least one agitator with a non-rotating mixing implement that extends into the waste material. The mixing implement has a plurality of sections that sequentially move inward and outward to gently mix the oxidizing and flocculating agents into the waste material. The mixing implement element includes an elongated shaft with sealed, flexible hose coaxially aligned thereover. Attached to the elongated shaft is at least one lateral arm perpendicularly aligned to the elongated shaft's longitudinal axis. Attached to the distal end of the lateral arm is a rotatable wheel transversely aligned with the longitudinal axis of the lateral arm. Coaxially aligned over the elongated shaft is a flexible hose designed to collapse inward when disposed inside the waste material. The ends of the flexible hose are sealed and the diameter of the hose is sufficient so that the rotatable wheels on the lateral arms hold the adjacent sidewall of the flexible hose outward. As the elongated shaft is rotated, the lateral arms attached thereto rotate and causing the sidewalls of the flexible hose to gently move inward and outward.

3 Claims, 3 Drawing Sheets

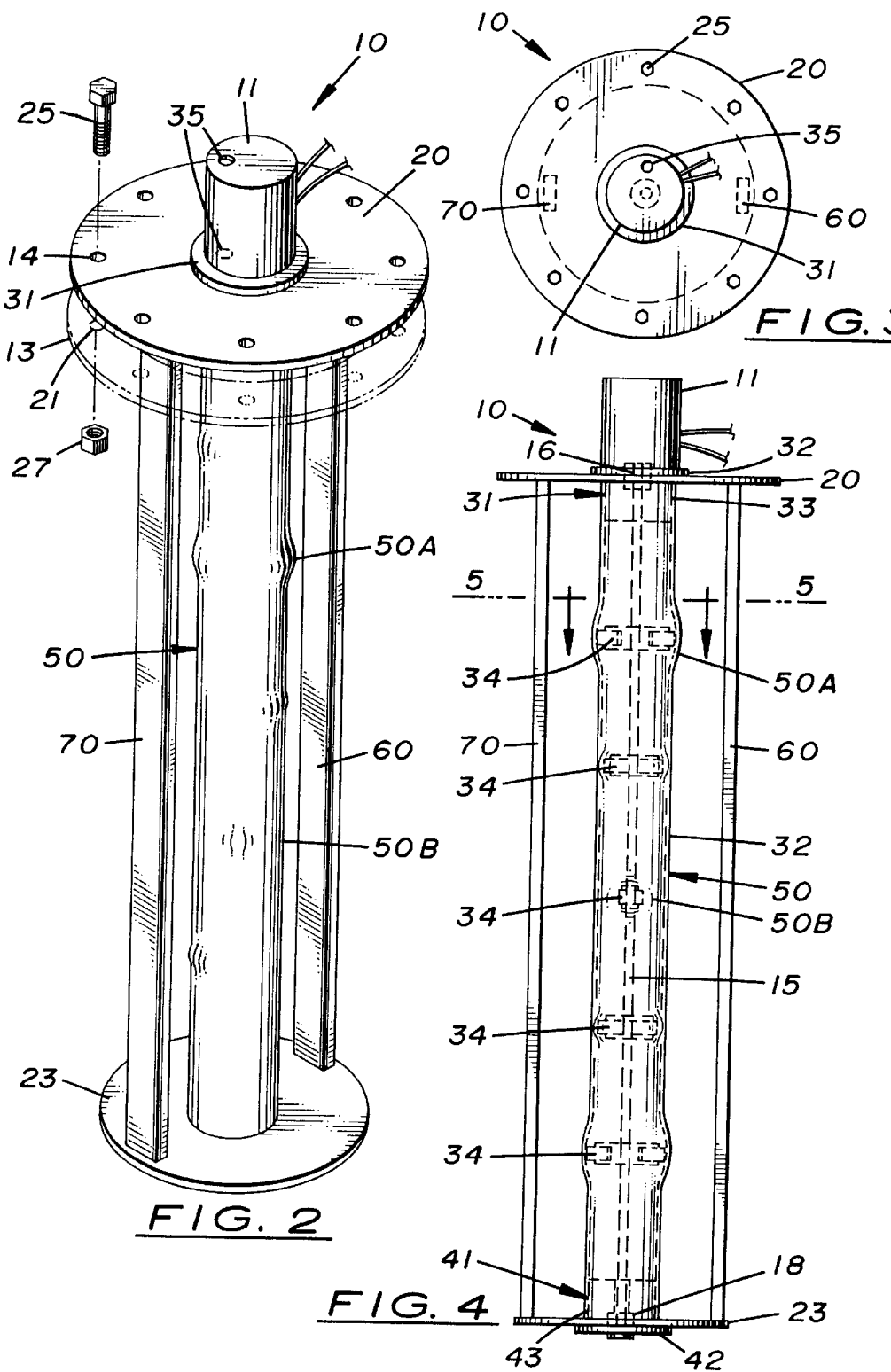

WASTE MATERIAL PROCESSING APPARATUS AND METHOD

BACKGROUND OF THE INVENTION

This is a continuation-in-part application of application Ser. No. 08/697,538, filed on Aug. 26, 1996, now abandoned.

1. Field of the Invention

This invention relates to an apparatus and method for mixing and agitating a mixture and, more particularly, to such an apparatus and method used to process waste material into sludge material and waste water.

2. Description of the Related Art

It is well known to process small batches of septic tank or portable toilet waste material into sludge material and waste water, (see U.S. Patent Nos. 5,380,427 and 5,536,418). During the process, the waste material is collected in a large processing tank transported by a motor vehicle. The waste material is then oxidized and separated into sludge material and waste water for land application or composting.

In order for the sludge material and waste water to be used for land application or composting, the waste material must be sufficiently oxidized. In addition, the percentage of suspended particles and foreign matter in the waste water must be reduced.

When the waste material is initially deposited in the processing tank, it automatically settles to form two layers—a lower layer of waste water and an upper layer of sludge material. In order to be oxidized, the waste material must be continuously mixed to suspend the particles so that they chemically interact with the oxidizing and flocculating agents. After a sufficient amount of mixing has occurred and sufficient time has expired, the mixing implement is stopped and the waste material is allowed to separate into two layers. When the separation process is complete, the sludge material and waste water are transported to the sewer treatment facility and removed from the processing tank.

Experiments have shown that precise amounts of oxidizing and flocculating agents must be added to the waste material in order for optimal oxidization and separation to occur. Experiments have also shown that oxidation and separation is more complete if the waste material is gently and thoroughly mixed when the oxidizing and flocculating agents are added to the waste material. Experiments have further shown that if the mixture is not mixed thoroughly, the oxidizing and flocculating agents are not adequately dispersed in mixture. Also, if the mixing process is too vigorous, the flocculating agent can be destroyed and separation does not occur.

Heretofore, impellers have been used as mixing implements in waste material processing tanks. Unfortunately, impellers are inadequate because they mix the mixture too vigorously and destroy the flocculating agent. The impellers often become wrapped or bound with foreign material, such as paper, hair and string, thereby forming a large sphere. When this occurs, the process must be discontinued and the impellers must be cleaned.

SUMMARY OF THE INVENTION

It is an object of the invention to provide an apparatus for gently mixing both oxidizing and flocculating agents into waste material in a processing tank.

It is another object of the invention to provide such an apparatus wherein the mixing implement sufficiently mixes and disperses the oxidizing and flocculating agents in the waste material.

It is a further object of the invention to provide such an apparatus wherein the mixing implement does not destroy the flocculating agent added to the waste material.

It is a still further object of the invention to provide such an apparatus wherein the mixing implement does not have a rotating outer surface which can become bound with foreign material.

These and other objects are met by providing a waste processing apparatus designed to process waste material into sludge material and waste water capable of being deposited for land application and composting. The apparatus includes a processing tank which uses at least one agitator with an improved mixing implement that mixes oxidizing and flocculating agents into waste material.

More specifically, each agitator includes a rotating means attached to the processing tank, and a mixing implement attached to the rotating means that extends into the processing tank. The mixing implement has a non-rotating outer surface which has a plurality of sections longitudinally aligned sections that move inward and outward to gently mix the waste material at different depths of the waste material. The mixing action created by the mixing implement is sufficient to thoroughly mix the agents into the waste material, yet sufficiently gently not to destroy the flocculating agent. The overall length of the mixing implement is sufficient so that it extends substantially the entire depth of the waste material when contained in the processing tank so that the agents are thoroughly mixed into the waste material. Also, the relative sizes of the processing tank and mixing implement are sufficient so that no vacuum forces are created in the mixture when the mixing implement is activated.

In the embodiment disclosed herein, the mixing implement includes an elongated shaft with a co-axially aligned flexible hose disposed thereover. During operation, a plurality of longitudinally aligned sections on the flexible hose move inward and outward to gently mix the waste material at different depths.

More particularly, the elongated shaft has a plurality of perpendicularly aligned lateral arms attached thereto. The lateral arms are radially spaced apart on the elongated shaft and the lengths of the lateral arms are sufficient so when the elongated shaft is rotated, their distal ends move in a circular path around the elongated shaft's longitudinal axis. Attached to the distal end of each lateral arm is a rotatable wheel. Each rotatable wheel is transversely aligned with the lateral arm's longitudinal axis so that it rotates over the inside surface of the flexible hose. The flexible hose is sufficiently flexible and has a sufficient inside diameter so that the portions of the flexible hose located between the lateral arms are forced inward by the surrounding waste material while the portion of the flexible hose located adjacent to the lateral arm is forced outward. When the elongated shaft is rotated by a motor, the lateral arms rotate within the flexible hose causing the flexible hose's sidewall to slowly move outward and inward thereby creating gentle wave action in the waste material. The lateral arms are radially spaced apart on the elongated shaft so that a current in the waste material is produced adjacent to the elongated shaft which flows in a direction parallel to the longitudinal axis of the elongated shaft to improve mixing. The opposite ends of the flexible hose are sealed to prevent waste material from entering the flexible hose and preventing clogging.

BRIEF DESCRIPTION OF THE DRAWINGS

FIG. 2 is a perspective view of the invention.

FIG. 3 is a top plan view of the invention.

FIG. 4 is a side elevational view of the invention.

DESCRIPTION OF THE PREFERRED EMBODIMENT(S)

Shown in the accompanying FIGS. 1–6, there is shown a apparatus, generally referred to as 10, designed for agitating a small batch of septic tank waste material contained in a processing tank 92 into reusable sludge material and waste water.

Figure 1:
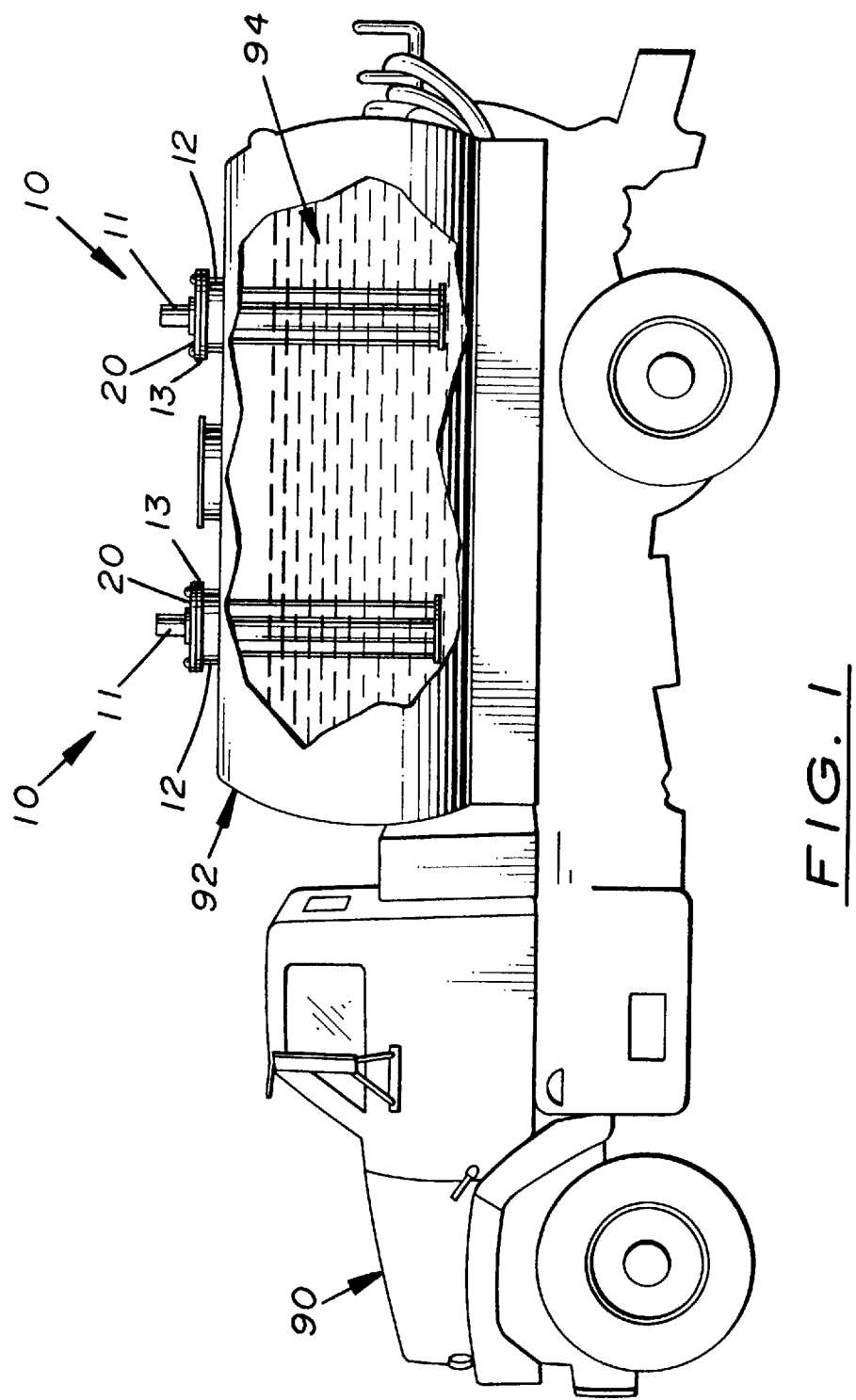
FIG. 1 is a side elevational view of a pump truck with a waste material processing tank attached thereto shown partially in section.

The apparatus includes at least one agitator 10 that attaches to the top surface of the processing tank 92 and extends vertically therein. Each agitator 10 includes a rotating means attached to a mixing implement with a non-rotating outer surface that extends into the waste material to gently mix oxidizing and flocculation agents therein. In the preferred embodiment, the mixing implement includes an elongated six inch diameter flexible hose 50 with flexible sidewalls that sequentially move inward and outward to gently agitate the surrounding waste material 94. As shown in FIG. 1, two agitators 10 are equally spaced apart in the processing tank which is located on the bed of a pumping truck 90. It should be understood, however, that the agitators 10 may be horizontally aligned inside the processing tank 92 and that the actual number of agitators 10 used can vary depending on the size of the processing tank 92. The processing tank 92 shown in FIG. 1 holds approximately 1,000 gallons of waste material 94.

As shown in FIG. 2, the agitator 10 is shown with the flexible hose 50 is perpendicularly aligned between a circular upper plate 20 and a horizontally aligned, circular lower plate 23. The upper plate 20 is attached to the elevated flange surface 13 located around the top opening (not shown) on the processing tank 92. The upper plate 20 is attached to the flange surface 13 using a plurality of bolts 25 and nuts 27 through bores 14 and 21 formed in the upper plate 20 and the flange surface 13, respectively. An opening (not shown) located centrally through the flange surface 13 enables the hose 50 to extend into the processing tank 92.

Located inside the flexible hose 50 is a longitudinally aligned elongated shaft 15 which rotates therein during use. The upper portion of the elongated shaft 15 extends through a central bearing 16 centrally located on the upper plate 20. The upper end of the elongated shaft 15 that extends through the upper plate 20 is connected to a rotating means, such as an electric motor 11, which slowly rotates the elongated shaft 15 either in one direction or back and forth between forward and backward directions during use. In the embodiment shown, the motor 11 produces approximately 1 hp and revolves at 750 RPM.

Located coaxially around the upper bearing 16 and extending downward from the upper plate 20 is an upper adaptor 31. The upper adaptor 31 includes a flange surface 32 and a cylindrical-shaped neck portion 33. During assembly, the flange surface 32 is positioned over the top surface of the upper plate 20 while the neck portion 33 extends therefrom and through the upper plate 20. During assembly, the neck portion 33 is inserted into the upper end opening on the hose 50. The outer diameter of the adaptor 31 and the inside diameter of the hose 50 are complimentary in size to create a water-tight seal therebetween when connected together. Air vents 35 are formed in the upper adaptor 31 and the outer housing of the motor 11 to allow air to escape and enter the hose 50 during use.

Located at the opposite end of the elongated shaft 15 is a lower bearing 18 which is centrally located on a lower adaptor 41. The lower adapter 41, which is similar to the upper adaptor 31, includes a flange surface 42 and a cylindrical-shaped, neck portion 43. The neck portion 43 extends upward from the flange surface 42 and the lower plate 23. During assembly, the neck portion 43 is inserted through a circular opening (not shown) located on the lower plate 23. The outer diameter of the lower adaptor 41 and the inside diameter of the flexible hose 50 are also complimentary to create a water-tight seal therebetween when connected together. The upper and lower adapters 31, 41 respectively, are fixed in position on the upper and lower plates 20, 23 respectively, so that the ends of flexible hose 50 is stationary therebetween.

Disposed and longitudinally aligned on opposite sides of the flexible hose 50, approximately 180° apart, are two, longitudinally aligned, connecting bars 60 and 70. Connecting bars 60, 70 are used to hold the upper and lower plates 20, and 23, spaced apart and parallel aligned during use.

Figure 5:
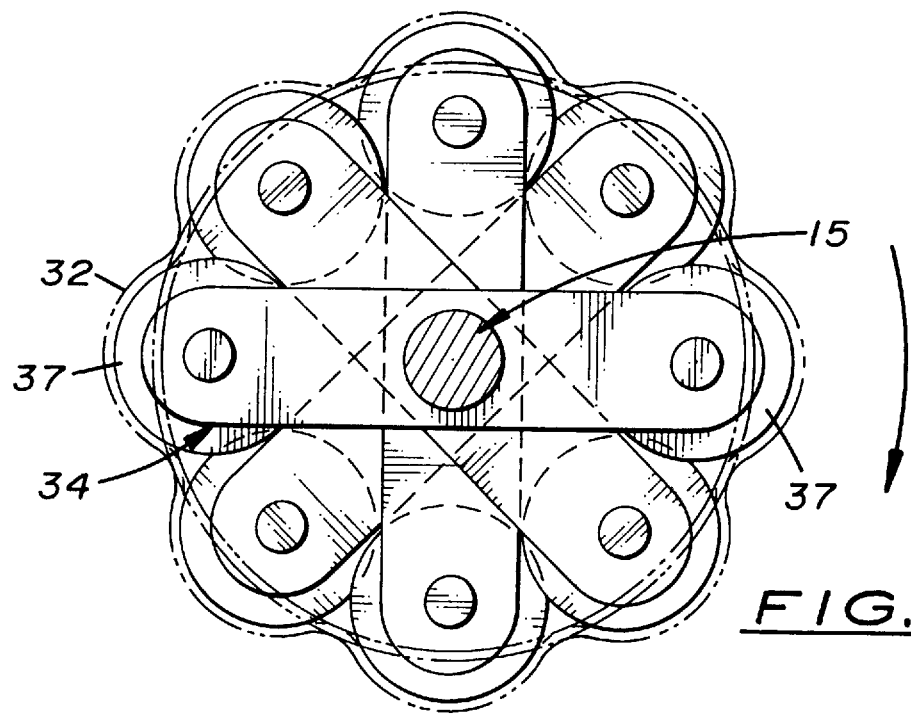
FIG. 5. is a sectional, plan view of the invention taken along line 5—5 in FIG. 3.
Figure 6:
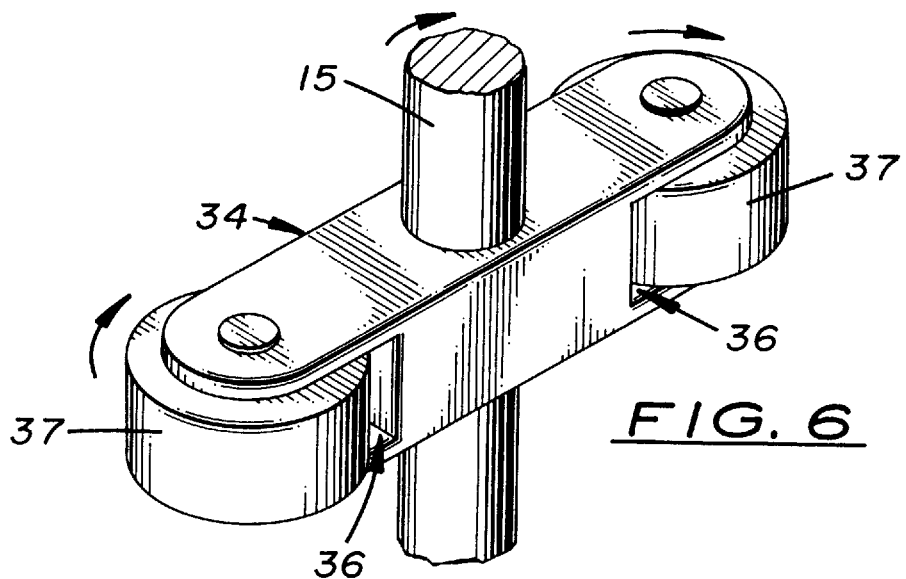
FIG. 6 is a perspective view of a lateral axis attached to the shaft.

Spaced apart and attached to the elongated shaft 15 are a plurality of lateral arms 34. Each lateral arm 34 is centrally attached to the shaft 15 so that they rotate therewith during operation, as shown in FIGS. 5 and 6. Each lateral arm 34 includes means for contacting the inside surface of the flexible hose 50 to prevent collapsing of the adjacent immediate portion of the flexible hose 50 when surrounded by waste material. In the embodiment shown, the means for contacting the inside surface of the flexible hose 50 is a rotatable wheel 37 disposed in a transversely aligned, U-shaped recessed portion 36 formed on each opposite end of the lateral arm 34. When the shaft 15 is rotated inside the hose 50, each rotatable wheel 37 contacts the inside surface of the flexible hose 50 and rotates thereon.

In the preferred embodiment, the upper and lower plates, 20, 23, the elongated shaft 15, the connecting bars 60, 70 and the adapters 32, 42 respectively, are made of strong durable material, such as steel or aluminum.

During use, each agitator 10 is positioned inside the processing tank 92 so that its flexible hose 50 extends therein and is surrounded by waste material 94. When each motor 11 is activated, the attached elongated shaft 15 rotates which causes the lateral arms 34 to move along the inside surface of the flexible hose 50. As each lateral arm 34 moves, the rotatable wheels 37 attached thereto rotate and travel in a circular path along the inside surface of the flexible hose 50. The section 50A of the flexible hose 50 immediately adjacent to the rotating wheel 37 is forced outward and prevented from collapsing. The section 50B of flexible hose 50 not in contact with the rotatable wheels 37 are forced inward by the waste material 94. The air vents 35 allow air to escape the flexible hose 50. In the preferred embodiment, the elongated shaft 15 is three to four feet in length with five lateral arms 34 evenly spaced apart and attached to the elongated shaft 15. The lateral arms 34 are radially aligned 30° apart so that the five lateral arms 34 complete a 360° arc and create a downward, spiral-like current in the waste material 94 during operation to improve mixing.

Using the above described apparatus, a novel method of processing waste material is also disclosed, comprising the following steps:

a. selecting a waste material processing apparatus including a processing tank, a rotating means attached to said processing tank, and a mixing implement attached to said rotating means, said rotating means being disposed in said processing tank and having a non-rotating outer surface with a plurality of longitudinally aligned sections which repeatedly move inward and outward when said rotating means is activated to mix waste material in said processing tank;

b. depositing waste material into a processing tank;

c. activating said rotating means causing said mixing implement to continuously and gently mix the waste material;

d. adding an oxidizing agent to the waste material;

e. adding a flocculating agent to the waste material;

f. deactivating said rotating means to discontinue said mixing element;

g. allowing said waste material to separate into a upper layer of sludge material and an lower layer of waste water; and, h. removing said sludge material and said waste water from said processing tank.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A waste material processing apparatus, comprising;

a. a processing tank capable of holding waste material;

b. an agitator disposed inside said processing tank, said agitator including an elongated shaft having a longitudinal axis and opposite proximal and distal ends;

c. a rotating means attached between said processing tank and said proximal end of said elongated shaft;

d. a flexible hose coaxially aligned over said elongated shaft, said hose being fixed and sealed at its opposite ends to prevent waste material from entering therein, said flexible hose having an inside surface and being sufficiently flexible so that said flexible hose may collapse inward when disposed over said elongated shaft and in said processing tank filled with waste material;

e. at least two lateral arms attached to said elongated shaft, each said lateral arm having a longitudinal axis, two opposite ends, and being longitudinally spaced apart on said elongated shaft; and, f. a rotatable wheel attached to each said opposite end of each said lateral arm, each said wheel being attached so that its axis of rotation is transversely aligned with said longitudinal axis of said lateral arm, said wheels being of a sufficient size to contact said inside surface of said hose and force said hose outward when said elongated shaft is rotated.

2. A waste material processing agitator, as recited in claim 1, further including said elongated shaft being disposed and held in position between two plates, said plates being spaced apart by at least two longitudinally aligned rods.

3. A method of processing waste material comprising the following steps:

a. selecting a waste material processing apparatus including a processing tank, a rotating means attached to said processing tank, and a mixing implement attached to said rotating means, said mixing implement being disposed in said processing tank and having a non-rotating outer surface with a plurality of longitudinally aligned sections which repeatedly move inward and outward when said rotating means is activated to mix waste material in said processing tank;

b. depositing waste material into said processing tank;

c. activating said rotating means causing said mixing implement to continuously and gently mix the waste material;

d. adding an oxidizing agent to the waste material;

e. adding a flocculating agent to the waste material;

f. deactivating said rotating means to discontinue the inward and outward movement of said mixing implement;

g. allowing said waste material to separate into a upper layer of sludge material and a lower layer of waste water; and, h. removing said sludge material and said waste water from said processing tank.

* * * * *